(12) United States Patent
Chen

(10) Patent No.: US 8,567,736 B2
(45) Date of Patent: Oct. 29, 2013

(54) MOUNTING APPARATUS FOR EXPANSION CARD

(75) Inventor: Li-Ping Chen, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 245 days.

(21) Appl. No.: 13/106,794

(22) Filed: May 12, 2011

(65) Prior Publication Data

US 2012/0091302 A1  Apr. 19, 2012

(30) Foreign Application Priority Data

Oct. 18, 2010  (TW) ............................... 99135380 A

(51) Int. Cl.
*A47F 5/00* (2006.01)

(52) U.S. Cl.
USPC ........ 248/310; 248/309.1; 248/694; 361/759; 361/801

(58) Field of Classification Search
USPC ........ 248/310, 316.8, 694, 309.1, 300, 311.2, 248/313, 906, 686, 689, 247, 248; 361/679.32, 679.5, 679.49, 801, 361/679.31, 679, 51, 807, 752, 796
See application file for complete search history.

(56) References Cited

U.S. PATENT DOCUMENTS

| | | | |
|---|---|---|---|
| 5,544,006 A * | 8/1996 | Radloff et al. ............ | 361/679.32 |
| 6,138,839 A * | 10/2000 | Cranston et al. ............ | 211/41.17 |
| 6,320,760 B1 * | 11/2001 | Flamm et al. ................. | 361/801 |
| 6,549,398 B2 * | 4/2003 | Chen ........................ | 361/679.58 |
| 6,985,360 B2 * | 1/2006 | Chen et al. .................... | 361/704 |
| 7,012,813 B2 * | 3/2006 | Wang et al. .................... | 361/801 |
| 7,035,117 B2 * | 4/2006 | Chen et al. .................... | 361/759 |
| 7,054,164 B2 * | 5/2006 | Shih-Tsung .................. | 361/801 |
| 7,123,470 B2 * | 10/2006 | Hsu et al. ................. | 361/679.02 |
| 7,254,041 B2 * | 8/2007 | Chen et al. .................... | 361/801 |
| 7,375,980 B2 * | 5/2008 | Peng et al. .................... | 361/801 |
| 7,381,081 B2 * | 6/2008 | Zhang et al. .................. | 439/377 |
| 7,443,666 B2 * | 10/2008 | Huang ..................... | 361/679.32 |
| 7,525,811 B2 * | 4/2009 | Xiao ............................. | 361/759 |
| 7,561,440 B2 * | 7/2009 | Dai .............................. | 361/801 |
| 7,626,830 B2 * | 12/2009 | Fan et al. ...................... | 361/801 |
| 7,701,725 B2 * | 4/2010 | Fan et al. ...................... | 361/785 |
| 7,808,801 B2 * | 10/2010 | Peng et al. .................... | 361/801 |
| 8,098,497 B2 * | 1/2012 | Chiang ......................... | 361/807 |
| 8,243,437 B2 * | 8/2012 | Chou et al. ............... | 361/679.49 |
| 8,254,130 B2 * | 8/2012 | Fan et al. ...................... | 361/724 |
| 8,379,399 B2 * | 2/2013 | Chiu et al. ..................... | 361/759 |
| 8,382,215 B2 * | 2/2013 | Chen ......................... | 312/223.2 |
| 2004/0184252 A1 * | 9/2004 | Lin et al. ...................... | 361/801 |
| 2006/0044767 A1 * | 3/2006 | Wu et al. ...................... | 361/725 |
| 2007/0177267 A1 * | 8/2007 | Chen et al. .................... | 359/514 |
| 2007/0177341 A1 * | 8/2007 | Chen et al. .................... | 361/683 |
| 2008/0212295 A1 * | 9/2008 | Xiao ............................. | 361/759 |
| 2009/0296363 A1 * | 12/2009 | Dai .............................. | 361/801 |

* cited by examiner

*Primary Examiner* — Terrell McKinnon
*Assistant Examiner* — Monica Millner
(74) *Attorney, Agent, or Firm* — Altis & Wispro Law Group, Inc.

(57) ABSTRACT

A mounting apparatus includes a chassis, a mounting tray accommodated in the chassis, and a securing member. The chassis includes a bottom plate and a rear plate connected to the bottom plate. The mounting tray is secured to the rear plate. The securing member is located between the bottom plate and the mounting tray. A through hole is defined in the securing member. The mounting tray is attached to a flange of a securing plate, and the through hole receives an insertion portion of the securing plate.

18 Claims, 7 Drawing Sheets

MOUNTING APPARATUS FOR EXPANSION CARD

BACKGROUND

1. Technical Field

The present disclosure relates to mounting apparatuses, and particularly to a mounting apparatus for securing expansion cards in an electronic device.

2. Description of Related Art

A computer system usually includes expansion cards, such as sound cards, video cards, and graphics cards, for enhancing capabilities of the computer system. The expansion cards are often attached to the computer system with screws, which is very laborious and time-consuming.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
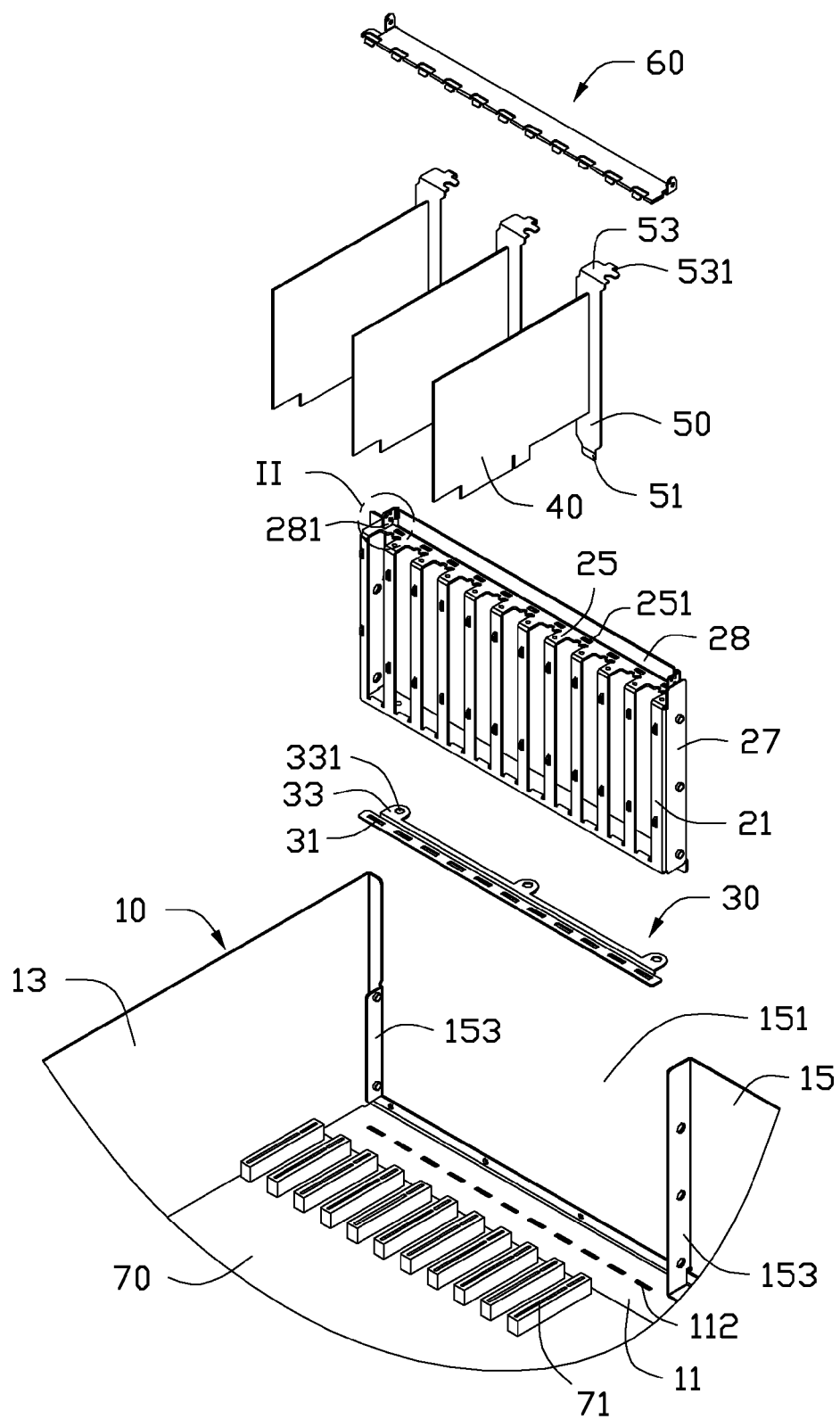
FIG. 1 is an exploded, cutaway, isometric view of a mounting apparatus for an expansion card in accordance with an embodiment.
Figure 2:
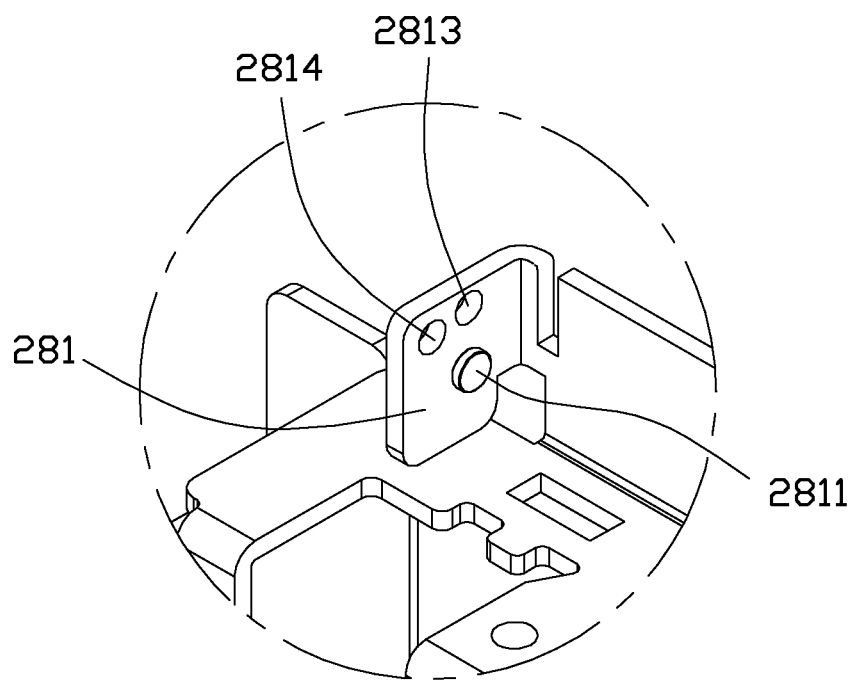
FIG. 2 is an enlarged view of circled portion II of FIG. 1.
Figure 3:
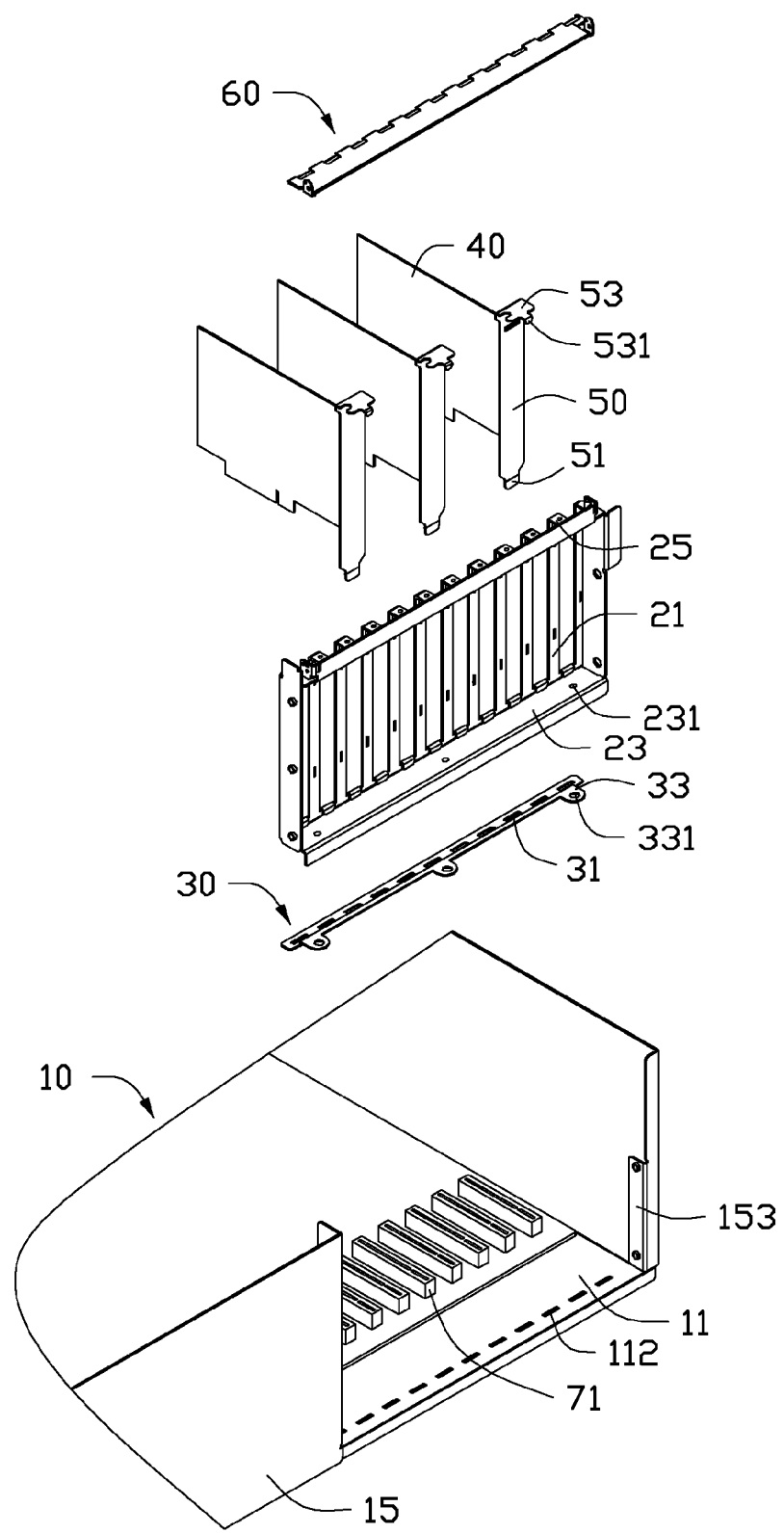
FIG. 3 is similar to FIG. 1, but viewed from a different aspect.

Referring to FIGS. 1 to 3, a mounting apparatus in accordance with one embodiment includes a chassis 10, a mounting tray 20, a securing member 30, and a clasping member 60. A plurality of expansion cards 40 is received in the mounting apparatus. In one embodiment, the expansion cards 40 may be, for example, sound cards, video cards, graphics cards, or other Peripheral Component Interconnection cards.

A securing plate 50 is attached to a front of each expansion card 40. An insertion portion 51 is located on a first end of the securing plate 50, and a flange 53, with a clipping piece 531, is located a second opposite end of the securing plate 50.

The chassis 10 includes a bottom plate 11, a side plate 13 and a rear plate 15. In one embodiment, the bottom plate 11 is substantially perpendicular to the side plate 13 and the rear plate 15. A motherboard 70, with a plurality of sockets 71, is located on the bottom plate 11. A plurality of receiving holes 112, adjacent to the rear plate 15, is defined in the bottom plate 11. In one embodiment, the plurality of receiving holes 112 is arranged in a line substantially parallel to the rear plate 15. A cutout 151 is defined in the rear plate 15. Two securing panels 153 are connected to opposite sides of the cutout 151.

The mounting tray 20 includes a bottom panel 23, an connecting panel 25, two side panels 27, located on opposite sides of the bottom panel 23, and a plurality of elastic pieces 21, connected to the bottom panel 23 and the connecting panel 25. Three mounting holes 231 are defined in the bottom panel 23. A plurality of clipping holes 251, configured for receiving the clipping piece 531 of the flange 53, is defined in the connecting panel 25. An extending panel 28 extends from the connecting panel 25, and two connecting arms 281 are connected to opposite sides of the extending panel 28. A post 2811 protrudes from each connecting arm 281. A first positioning hole 2813 and a second positioning hole 2814, adjacent to the post 2811, are defined in each connecting arm 281.

A plurality of through holes 31, corresponding to the plurality of receiving holes 112, is defined in the securing member 30. Three securing pieces 33, each with a securing hole 331, extend from a side of the securing member 30.

Figure 4:
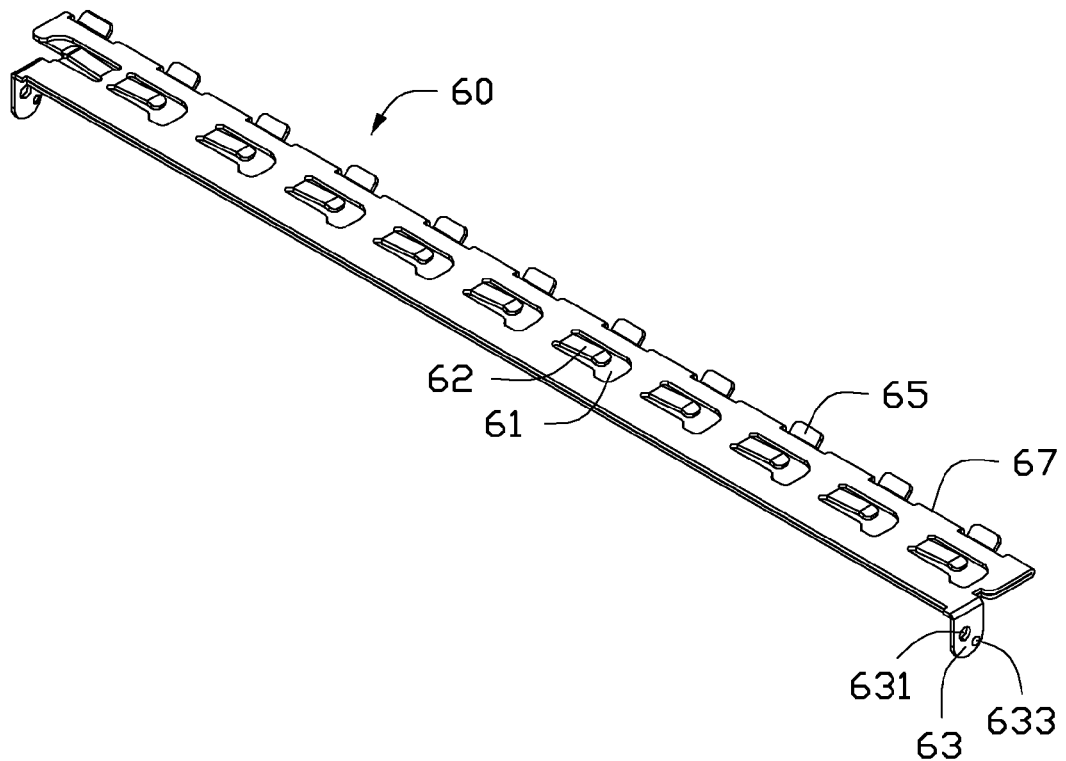
FIG. 4 is an isometric view of a clasping member of the mounting apparatus of FIG. 1.

Referring to FIG. 4, a plurality of openings 61 are defined in the clasping member 60. An elastic stopper piece 62 extends from the clasping member 60 into each opening 61. Two pivot pieces 63, each with a pivot hole 631, are connected to opposite sides of the clasping member 60. A positioning protrusion 633, corresponding to the first and second positioning holes 2813, 2814, is located in the pivot piece 63. A plurality of catches 65 is located on the clasping member 60. A plurality of retaining portions 67 is located on the clasping member 60, and each retaining portion 67 is located between the plurality of adjacent two of the plurality of catches 65.

Figure 5:
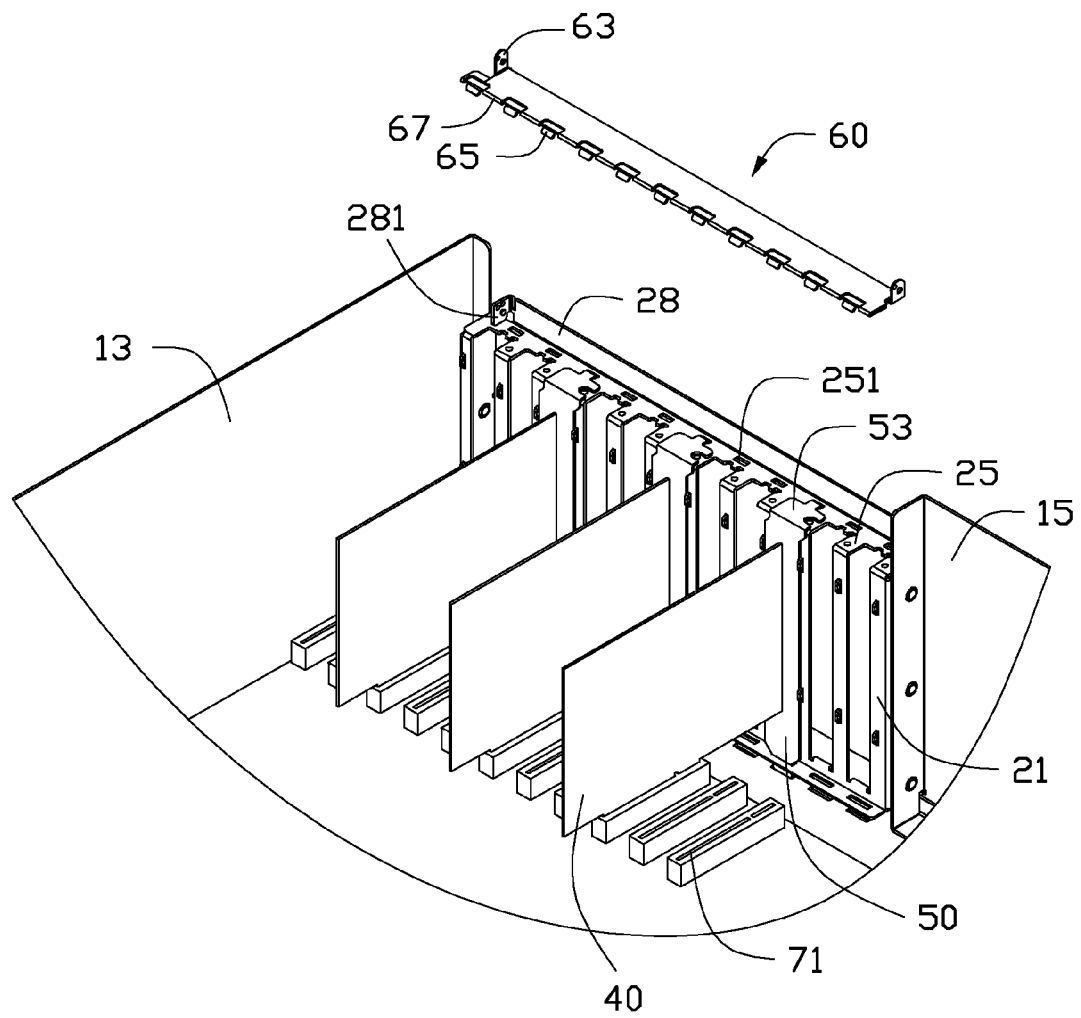
FIG. 5 is an assembled view of FIG. 1.
Figure 6:
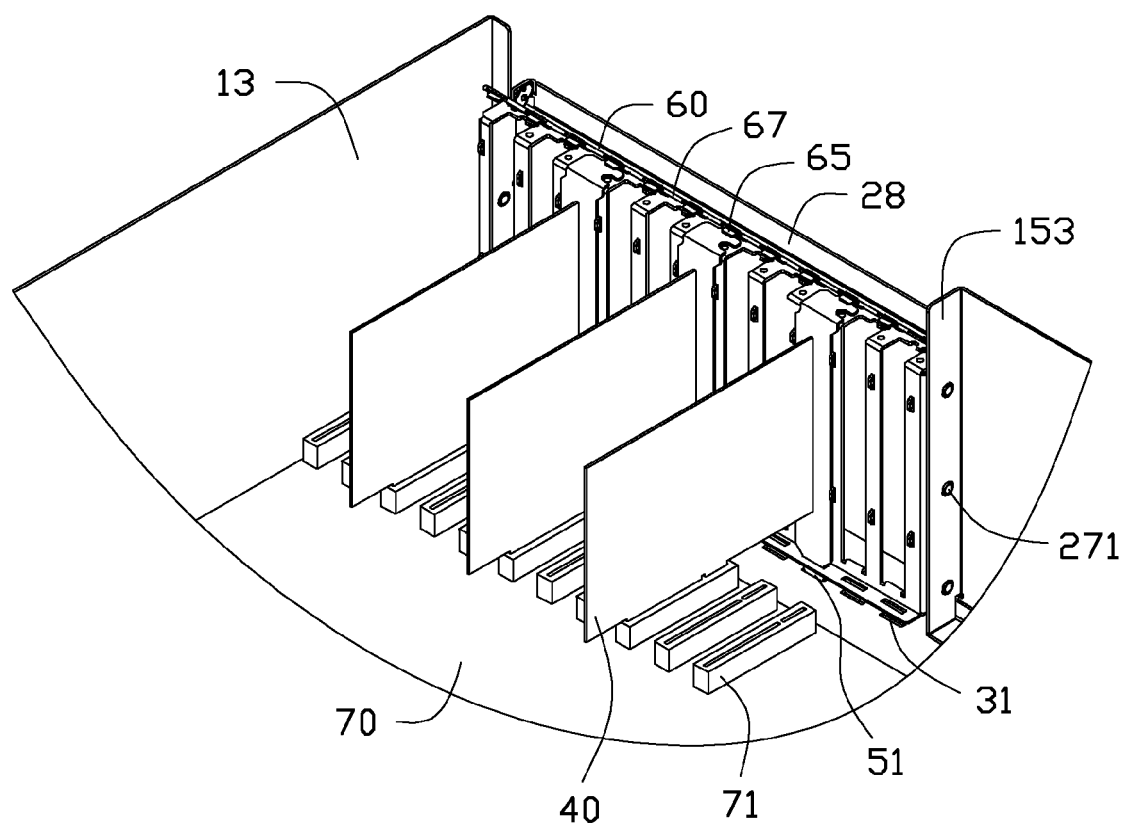
FIG. 6 is similar to FIG. 5, but shows the clasping member in a first position.
Figure 7:
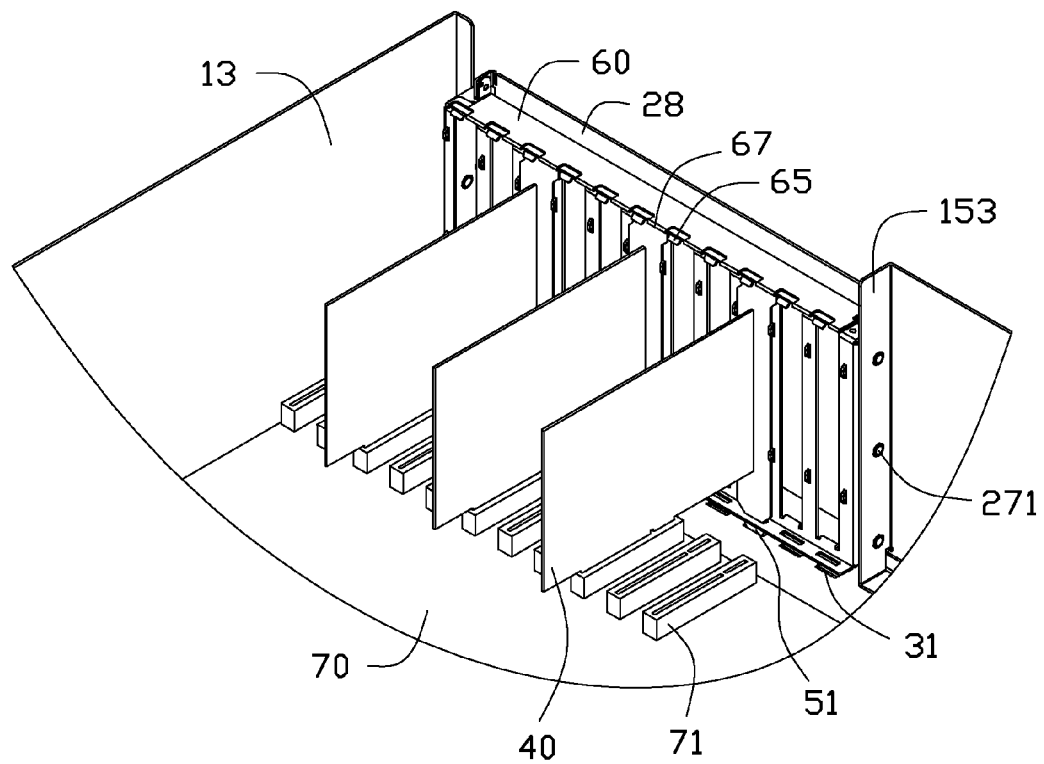
FIG. 7 is similar to FIG. 6, but shows the clasping member in a second position.

Referring to FIGS. 5-7, in assembly, the securing member 30 is placed on the bottom plate 11, and the plurality of through holes 31 is aligned with the plurality of receiving holes 112. The mounting tray 20 is received in the cutout 151, and the two side panels 27 are secured to the two securing panels 153 with a known fastening technology, such as jointing or screws. The three mounting holes 231 are aligned with the three securing holes 331. Three fixing members, such as screws, are engaged in the three mounting holes 231 and the securing holes 331. The mounting tray 20 is thereby secured to the securing member 30. In an embodiment, the securing member 30 is substantially perpendicular to the rear plate 15.

The clasping member 60 is located between the two connecting arms 281 of the extending panel 28. Each post 2811 is engaged in each corresponding pivot hole 631 of the clasping member 60. The clasping member 60 is rotated relative to the connecting arm 281 between a first position (see FIG. 6), where the positioning protrusion 633 is engaged in the first positioning hole 2813, and a second position (see FIG. 7), where the positioning protrusion 633 is engaged in the second positioning hole 2814.

The three expansion cards 40 are inserted into the corresponding sockets 71 of the motherboard 70. The insertion portion 51 of each securing plate 50 is passed through the corresponding through hole 31 and inserted into the corresponding receiving hole 112 of the bottom plate 11. The flange 53 of each securing plate 50 is located between the connecting panel 25 of the mounting tray 20 and the elastic stopper piece 62 of the clasping member 60. The clipping piece 531 of each securing plate 50 is engaged in the corresponding clipping hole 251.

The clasping member 60 is pressed down towards the connecting panel 25. The plurality of elastic stopper pieces 62 is deformed to abut the flange 53, until the positioning protrusion 633 of each pivot piece 63 is engaged in the second positioning hole 2814 of each connecting arm 281. Therefore, the clasping member 60 is located in the second position. The plurality of catches 65 and retaining portions 67 abut the flange 53 of each securing plate 50 (see FIG. 7).

In disassembly, the clasping member 60 is rotated from the second position to the first position, and each positioning protrusion 633 is disengaged from each second positioning hole 2814 and engaged into each first positioning hole 2813. The clipping pieces 531 are removed from the clipping hole 251, and the insertion portions 51 are removed from the through holes 31 and the receiving holes 112. Therefore, the expansion cards 40 are disengaged from the expansion slots 71.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
   a chassis comprising a bottom plate and a rear plate connected to the bottom plate;
   a mounting tray accommodated in the chassis and attached to the rear plate; the mounting tray comprises a bottom panel; and
   a securing member detachable from the mounting tray; the securing member attached to a bottom surface of the bottom panel; a through hole defined in the securing member;
   wherein the mounting tray is adapted to be attached to a flange of a securing plate, and the through hole is adapted to receive an insertion portion of the securing plate; and
   a securing piece extends from the securing member, a securing hole defined in the securing piece, a mounting hole is defined in the bottom panel; the securing hole is aligned with the mounting hole, a fixing member is engaged in the mounting hole and the securing hole to engage the securing member with the bottom panel.

2. The mounting apparatus of claim 1, wherein the mounting tray further comprises a connecting panel, a clipping hole is defined in the connecting panel, and the flange comprises a clipping piece engaged in the clipping hole.

3. The mounting apparatus of claim 2, further comprising a clasping member rotatably secured to the mounting tray, the clasping member comprising an elastic stopper piece, and the elastic stopper piece abuts the flange.

4. The mounting apparatus of claim 3, wherein the mounting tray further comprises an extending panel substantially perpendicular to the connecting panel, a connecting arm extends from the extending panel, and the clasping member comprises a pivot piece that is engaged with the connecting arm.

5. The mounting apparatus of claim 4, wherein a first positioning hole and a second positioning hole are defined in the connecting arm, the pivot piece comprises a positioning protrusion, the clasping member is rotatable between a first position, where the positioning protrusion is engaged in the first positioning hole, and the clasping member is disengaged from the flange; and a second position, where the positioning protrusion is engaged in the second positioning hole, and the clasping member abuts the flange.

6. The mounting apparatus of claim 5, wherein in the second position, the clamping member is substantially parallel to the connecting panel.

7. The mounting apparatus of claim 5, wherein the clasping member further comprises a catch, and in the second position, the catch abuts the securing plate.

8. A mounting apparatus comprising:
   a chassis comprising a bottom plate and a rear plate connected to the bottom plate; the bottom plate defining a receiving hole;
   a mounting tray accommodated in the chassis and secured to the rear plate;
   a securing plate, adapted to be attached to an expansion card, comprising an insertion portion and a flange; a securing member located between the bottom plate and the mounting tray, and the securing member defining a through hole, which is aligned with the receiving hole of the bottom plate; and
   a clasping member rotatably secured to the mounting tray;
   wherein the flange is located between the clasping member and the mounting tray, and the insertion portion-extends through the through hole and engaged in the receiving hole.

9. The mounting apparatus of claim 8, wherein the securing member is substantially perpendicular to the rear plate.

10. The mounting apparatus of claim 8, wherein a securing piece extends from the securing member, a securing hole is defined in the securing piece, a mounting hole is defined in the bottom panel; the securing hole is aligned with the mounting hole, a fixing member being engaged in the mounting hole and the securing hole to engage the securing member with the bottom panel.

11. The mounting apparatus of claim 10, wherein the mounting tray further comprises a connecting panel, a clipping hole is defined in the connecting panel, and the flange comprises a clipping piece engaged in the clipping hole.

12. The mounting apparatus of claim 11, wherein the mounting tray further comprises an extending panel substantially perpendicular to the connecting panel, a connecting arm extends from the extending panel, and the clasping member comprises a pivot piece that is engaged with the connecting arm.

13. The mounting apparatus of claim 12, wherein a first positioning hole and a second positioning hole are defined in the connecting arm, the pivot piece comprises a positioning protrusion, the clasping member is rotatable between a first position, where the positioning protrusion is engaged in the first positioning hole, and the clasping member is disengaged from the flange; and a second position, where the positioning protrusion is engaged in the second positioning hole, and the clasping member abuts the flange.

14. The mounting apparatus of claim 13, wherein in the second position, the clasping member is substantially parallel to the connecting panel.

15. The mounting apparatus of claim 13, wherein the clasping member further comprises an elastic stopper piece, and in the second position, the elastic stopper piece abuts the flange.

16. The mounting apparatus of claim 13, wherein the clasping member further comprises a catch, and in the second position, the catch abuts the securing plate.

17. A mounting apparatus comprising:
   a chassis comprising a bottom plate and a rear plate connected to the bottom plate;
   a mounting tray accommodated in the chassis and secured to the rear plate, a first positioning hole and a second positioning hole defined in the mounting tray;
   a securing member located between the bottom plate and the mounting tray, and a through hole defined in the securing member; and a clasping member, rotatably secured to the mounting tray, comprising a positioning protrusion;

wherein the through hole, and the clasping member is rotatable between a first position, where the positioning protrusion is engaged in the first positioning hole, and a second position, where the positioning protrusion is engaged in the second positioning hole.

18. The mounting apparatus of claim 17, wherein the securing member is substantially perpendicular to the rear plate.

* * * * *